(12) United States Patent
Figge et al.

(10) Patent No.: US 8,827,585 B2
(45) Date of Patent: Sep. 9, 2014

(54) FASTENING DEVICE WITH TOLERANCE COMPENSATION

(75) Inventors: Hans-Ulrich Figge, Schloβ-Holte (DE); Karl-Heinz Kohlbrenner, Goldbach (DE); Michael König, Bielefeld (DE)

(73) Assignee: Böllhoff Verbindungstechnik GmbH (DE)

( * ) Notice: Subject to any disclaimer, the term of this patent is extended or adjusted under 35 U.S.C. 154(b) by 114 days.

(21) Appl. No.: 13/411,047

(22) Filed: Mar. 2, 2012

(65) Prior Publication Data

US 2012/0272506 A1    Nov. 1, 2012

(30) Foreign Application Priority Data

Mar. 3, 2011   (DE) .................. 10 2011 001 052

(51) Int. Cl.
*F16B 5/02*    (2006.01)
(52) U.S. Cl.
USPC ......... 403/168; 403/408.1; 411/183; 411/433
(58) Field of Classification Search
USPC .............. 403/167, 168, 408.1; 411/183, 432, 411/433, 535, 546
See application file for complete search history.

(56) References Cited

U.S. PATENT DOCUMENTS

| | | | |
|---|---|---|---|
| 5,288,191 A | 2/1994 | Ruckert et al. | |
| 6,357,953 B1 * | 3/2002 | Ballantyne | ...................... 403/43 |
| 6,776,566 B2 * | 8/2004 | Kobusch et al. | .............. 411/546 |
| 8,061,948 B2 * | 11/2011 | DeGelis | ........................ 411/546 |
| 8,066,465 B2 | 11/2011 | Figge et al. | |
| 8,202,033 B2 * | 6/2012 | Choi et al. | ..................... 411/546 |
| 2002/0176739 A1 | 11/2002 | Goto et al. | |
| 2006/0280579 A1 * | 12/2006 | Seidl et al. | ..................... 411/546 |
| 2007/0009342 A1 | 1/2007 | Figge et al. | |
| 2007/0041808 A1 | 2/2007 | Iwata et al. | |
| 2009/0067921 A1 * | 3/2009 | Ito et al. | ..................... 403/408.1 |
| 2011/0243655 A1 | 10/2011 | Binder et al. | |

FOREIGN PATENT DOCUMENTS

| | | |
|---|---|---|
| DE | 102008055526 A1 | 6/2010 |
| EP | 1 666 342 B1 | 10/2008 |
| EP | 1 260 717 B1 | 12/2009 |
| WO | 2010022841 A1 | 3/2010 |
| WO | WO 2010/066363 A1 | 6/2010 |

\* cited by examiner

*Primary Examiner* — Michael P Ferguson (74) *Attorney, Agent, or Firm* — Hiscock & Barclay, LLP (57) ABSTRACT

A fastening device for fastening a first component B1 to a second component B2, with automatic compensation of tolerances in the distance S between the first component B1 and the second component B2. The fastening device includes a holding element and an adjusting element. A carrying element is provided on the adjusting element, the carrying element having a ring which is spring-loaded in the axial direction of the adjusting element, and in which a carrying element includes a carrying element thread and an overcomeable carrying element thread blocking means.

8 Claims, 9 Drawing Sheets

FASTENING DEVICE WITH TOLERANCE COMPENSATION

FIELD OF THE INVENTION

The invention relates to a fastening device for fastening a first component to a second component, with automatic compensation of tolerances between these components; further, a component with an installed fastening device; and a method of installation of a fastening device.

BACKGROUND OF THE INVENTION

Numerous types of fastening devices with tolerance compensation are known. Typically, these devices comprise an adjusting bushing with a so-called "carrying section" or "dragging section", which can enter into a friction-locked connection to a fastening screw. When the fastening screw is rotated, the adjusting bushing is then rotated along with it, until the bushing abuts against one of the two components which are disposed a distance apart. When the fastening screw is further rotated, with corresponding increasing of the torque, the friction-locked connection between the fastening screw and the carrying or dragging section is overcome, so that then the two components can be forcibly held together by the fastening screw, via the adjusting bushing.

EP 1666342 B1 describes such a fastening device, with a carrying or dragging section disposed on the fastening screw. In particular, the carrying section is comprised of a deformed thread region which cannot be screwed into the inner thread of the compensating element. Therefore, the compensating element is first rotated along with the fastening screw, by the fastening screw. Only when the compensating element abuts against a component, a blocked torque can be overcome, so that the deformed thread region enters into the thread of the compensating element. In addition to the carrying or dragging element itself, the tolerance compensating element has a space-consuming design in both the radial and the axial direction, so that a correspondingly large space in the installation between the two components must be provided for.

EP 1260717 discloses a fastening device wherein the fastening screw also carries the compensating element along with it as it rotates. This co-rotation is brought about, e.g., in that the thread of the fastening screw is coated with a frictional agent or the like, so that an elevated torque is needed to screw the fastening screw into the thread of the compensating element. Thus, the compensating element is rotated along with the fastening screw, until the compensating element abuts against the opposing component.

In the fastening device of WO 2010/066363 A1, a compensating element is provided, the interior side of which is similar to that of a carrying bushing. This carrying bushing of plastic provides a friction-locked connection for the fastening screw, as a result of its reduced diameter compared to the outer diameter of the fastening screw. On this basis, the fastening screw rotates carrying the compensating element with it, until the compensating element abuts against the opposite component. This plastic bushing for carrying along the compensating element has an inner thread which is smaller than the outer thread of the fastening screw. Therefore, a higher torque is needed in order to screw the fastening screw into this plastic bushing, so that the fastening screw initially rotates carrying the compensating element along with it. This fastening device also requires a large accommodation space both in the radial and the axial direction, so that it is disadvantageous in a situation where economy of space is needed. Also, the fastening screw must fully pass through the plastic bushing during installation, which increases the time needed for installation of the fastening device, due to the increased torque. If the plastic bushing is dimensioned too short or too soft, the fastening screw may be passed through in a disadvantageous manner.

Based on the above-discussed state of the art, the underlying problem of the present invention is to provide a fastening device for fastening a component B to a component A with automatic tolerance compensation in the distance between the two components, which device requires small accommodating space and is installable at low cost compared to the state of the art.

SUMMARY OF THE INVENTION

The above underlying problem is solved by a fastening device for fastening a first component to a second component with automatic compensation of tolerances in the distance between the first component and the second component by a component with an installed fastening device and by a method of installation for the fastening device in accordance with the independent claims of this application. Additional embodiments, variants, modifications, and further developments of the invention are set forth in the dependent claims and in the specification in combination with the drawings.

The inventive fastening device has the following features: a holding element and an adjusting element, which are screwable together via an outer thread of the holding element and an inner thread of the adjusting element, in a first thread pairing with a first thread direction, wherein a fastening screw is screwable into the holding element via a second thread pairing with a thread direction opposite to that of the first thread direction, which fastening screw is releasably connectable to the adjusting element via a carrying or dragging element, such that when the fastening screw is rotated the adjusting element is rotated along with it, thereby, for purposes of tolerance compensation, moving the adjusting element in abutment against the second component, wherein the carrying or dragging element has a spring-loaded ring which is spring-loaded in the axial direction of the adjusting element, and the carrying or dragging element has a carrying element thread and an overcomeable carrying element thread blocking means.

The inventive fastening device provides a design which is less space consuming than the state of the art, which inventive device is distinguished by smooth and easy installation, and effective tolerance compensation. The connection of the holding element and the adjusting element via an external thread of the holding element provides a compact arrangement. The special carrying element design based on a spring-loaded ring with a carrying or dragging element thread and a carrying element thread blocking means provides reliable rotational carrying of the adjusting element with the rotational movement of the fastening screw. The carrying element thread guarantees that the fastening screw cannot be pressed through the carrying element. Further, the carrying element provides a reliable coupling to the fastening screw, so that after the carrying element thread enters into the thread of the fastening screw, immediately a rotational movement of the fastening screw is transmitted to the adjusting element, to achieve effective tolerance compensation. In addition, the combination of the carrying element thread and the carrying element thread blocking means in the carrying element serves to prevent high friction forces from impeding (or making more difficult) the rotation of the fastening screw into the carrying element, and in this way lengthening the time of installation of the fastening device.

According to a preferred embodiment of the fastening device, the carrying element thread blocking means in combination with the carrying element thread is in the form of an undersized thread compared to the thread of the fastening screw, so that a nominal diameter of the thread of the fastening screw is greater than a nominal diameter of the carrying element thread. Because the undersized thread of the carrying element has a smaller nominal diameter than the thread of the fastening screw, a threshold torque between the carrying element and the fastening screw must be overcome, in order to screw the fastening screw into the carrying element. As long as this threshold torque is not reached, the fastening screw rotates the adjusting element along with it over the carrying element, and thereby adjusts for the distance between the first and second components. Only when the adjusting element comes to abut against the second component does the torque between the fastening screw and the carrying element increase above the threshold torque value, and the fastening screw is screwed into the holding element.

According to an embodiment of the inventive fastening device, the carrying element has a fastening ring which is joinable to the adjusting element, preferably by pressing-on. It is also preferable if the spring-loaded ring of the carrying element is disposed on the fastening ring via at least two projections which extend in the radial direction.

The carrying element thread of the carrying element is adjusted to the thread of the fastening screw. The fact that the ring on the fastening ring is spring-loaded ensures that the carrying element and thereby the carrying element thread are spring-loadedly displaceable in the axial direction, so that the carrying element is automatically displaced into an adjusted axial insertion position for inserting the rotating fastening screw into the carrying element thread and/or into the inner thread of the holding element. Due to the automatic adjustment between the thread of the fastening screw and the carrying element thread, the fastening screw enters into the carrying element nearly frictionlessly.

The carrying element thread blocking means of the carrying element blocks further advancing of the fastening screw, so that the rotation of the fastening screw is transferred to the adjusting element. Additionally, the fastening screw must not cut any threads in the carrying element.

According to another preferred embodiment of the invention, the carrying element thread has a maximum of one thread turn, over an angle of rotation of at most 360°. It is also preferred to form the carrying element thread over an angle of rotation less than 360°, as long as a reliable co-rotation of the adjusting element by the fastening screw is guaranteed. Accordingly, carrying element threads are employed which extend over a rotational angle of 0-270°, and preferably 0-180°.

According to another embodiment of the invention, the carrying element thread blocking means of the carrying element is comprised of a radially inwardly extending detent or cam. Another alternative form for the carrying element thread blocking means comprises an axially extending projection, which blocks the carrying element thread against further rotational penetration by the fastening screw. Both the radially inwardly extending detent and the axially extending projection are radially outwardly irreversibly deformable or radially outwardly displaceable, so that when a torque threshold is exceeded the carrying element thread blocking means can be overcome with the aid of the fastening screw, so that the fastening screw will be capable of being screwed-in further. The detent (or the projection) is preferably disposed close to the outlet of the carrying element thread.

According to yet another preferred embodiment of the fastening device, the holding element has at least one latch recess on an end face facing the carrying element, so that the adjusting element is releasably blocked against rotation, via a circularly arcuate or tangentially extending spring-loaded arm with a latch projection, on the fastening ring, or an axial latch projection on the spring-loaded ring. With this arrangement, transport security for the fastening device is provided.

According to another embodiment of the invention, the holding element has a rivet collar whereby the holding element is fixable in a guide in the first component. This type of fastening of the holding element allows a space-saving connection, so that the holding element is terminated flush with the first component.

Further, the inventive fastening device in one of the above-described configurations preferably has the fastening screw.

In addition, the invention comprises a component with the installed fastening device according to one of the above-described alternatives.

Additionally, the invention comprises a method of installation of a fastening device between a first component and a second component, with automatic tolerance compensation in the distance between the first component and the second component, wherein the fastening device has a holding element, an adjusting element, a fastening screw, and a carrying element, with a spring-loaded ring spring-loaded in the axial direction of the adjusting element, with a carrying element thread, and an overcomeable carrying element thread blocking means. The installation method comprises the following steps:

The holding element is fixed to the first component, wherein the adjusting element is pre-mounted on the holding element;

The spring-loaded ring is axially positioned with the aid of the fastening screw, so that the fastening screw can be screwed-in into the carrying element thread having the overcomeable carrying element thread blocking means, and/or into an inner thread of the holding element;

The fastening screw is screwed-in into the carrying element thread;

The adjusting element is rotated by means of the carrying element with the fastening screw, until the distance between the first component and the second component has been adjusted for; and The carrying element blocking means is overcome by rotating the fastening screw and screwing the fastening screw into the holding element, so that the first component is now fastened to the second component.

In a further preferred embodiment of the installation method, when the carrying element thread blocking means is overcome, the fastening screw radially outwardly displaces a radially inwardly projecting detent or an axially extending projection. It is further preferred that the radially inwardly extending detent be radially outwardly irreversibly deformed by the fastening screw, or be radially outwardly reversibly pressed.

BRIEF DESCRIPTION OF THE DRAWINGS

The invention will be described in more detail with reference to the accompanying drawings, in which.

DETAILED DESCRIPTION OF THE PREFERRED EMBODIMENTS

Figure 10:
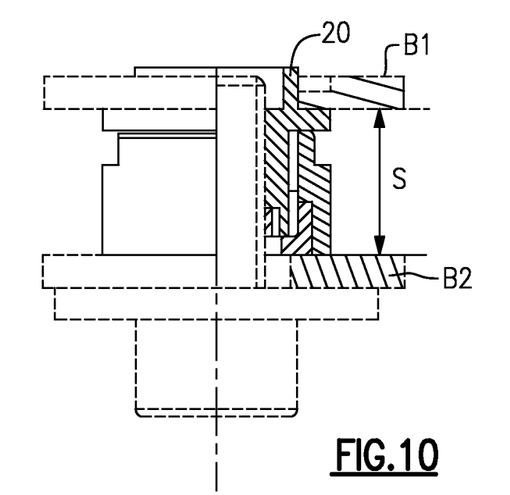
FIG. 10 is a partial cross section of a preferred embodiment of the fastening device in an installed state between the first and second component.
Figure 11:
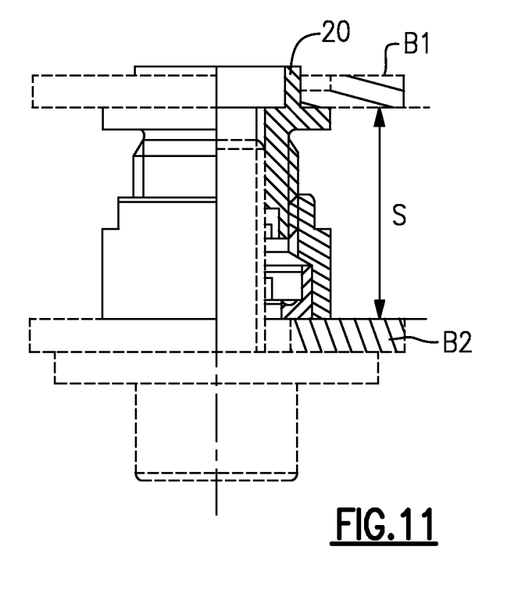
FIG. 11 is a preferred embodiment of the fastening device in a different installation position between the first and second component.

The fastening device illustrated in FIGS. 10 and 11 serves to fasten a first component B1 to a second component B2. The second component B2 is, for example, a support of a motor vehicle, while the first component B1 is a part of a headlight housing fixed by fixtures. According to a further embodiment, the first component B1 is a guide rail for a sliding roof, which is fastened to the vehicle frame, thus to the second component B2. The first component B1 and the second component B2 are at a distance S apart, which can vary based on tolerances related to mounting and/or fabrication conditions. The fastening device illustrated allows automatic adjustment of these tolerances.

The fastening device is comprised of a holding element 10, an adjusting element 30, and a fastening screw 70. The holding element 10 and the adjusting element 30 form a pre-assemblable component unit E, as illustrated in an exploded view in FIG. 5.

Figure 1:
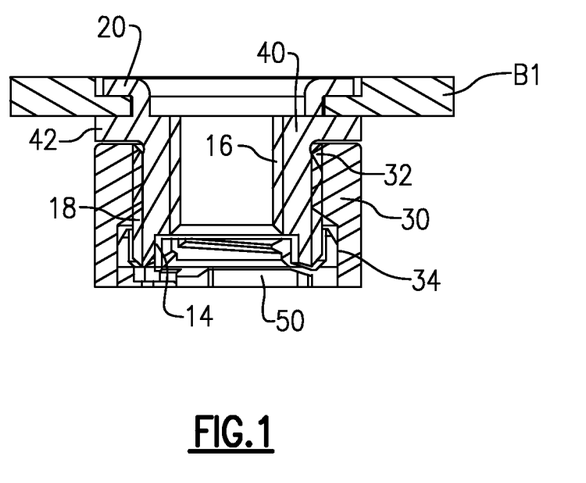
FIG. 1 is a cross section of a preferred embodiment of the inventive fastening device.
Figure 2:
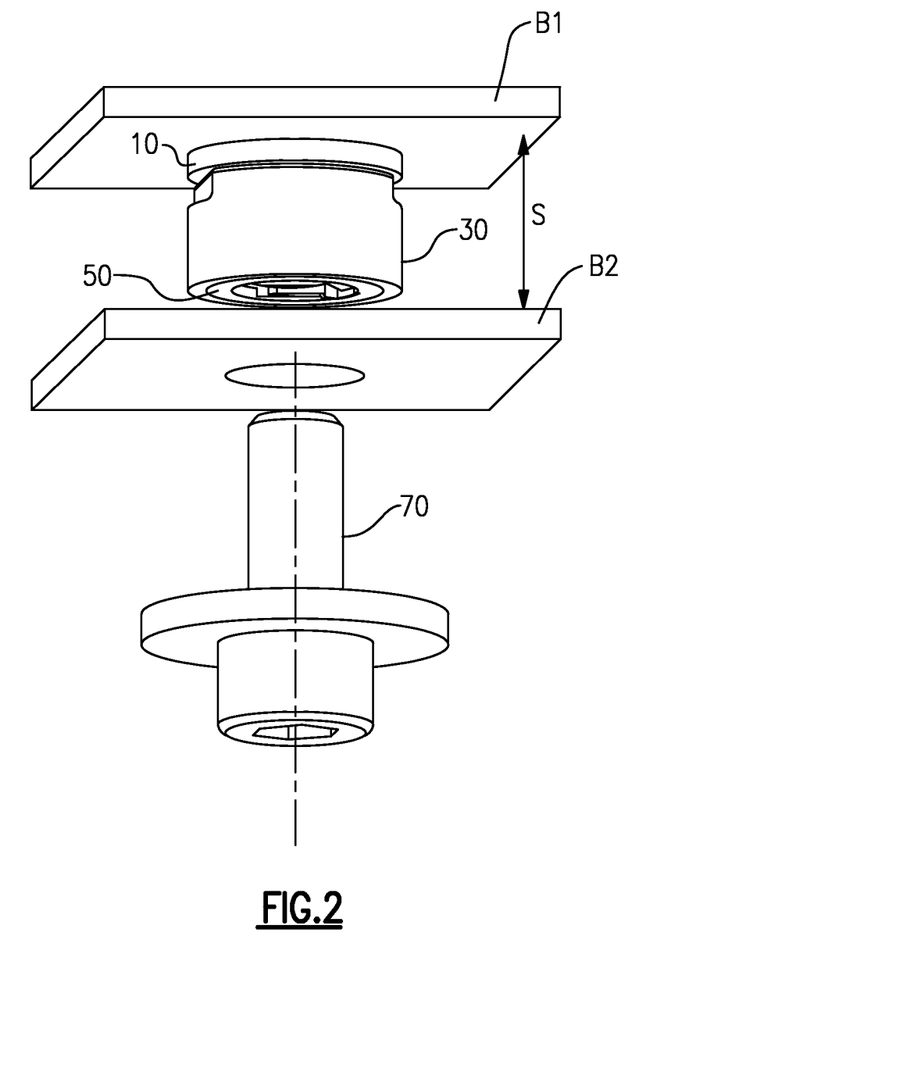
FIG. 2 is a perspective exploded view of a preferred embodiment of the inventive fastening device.
Figure 3:
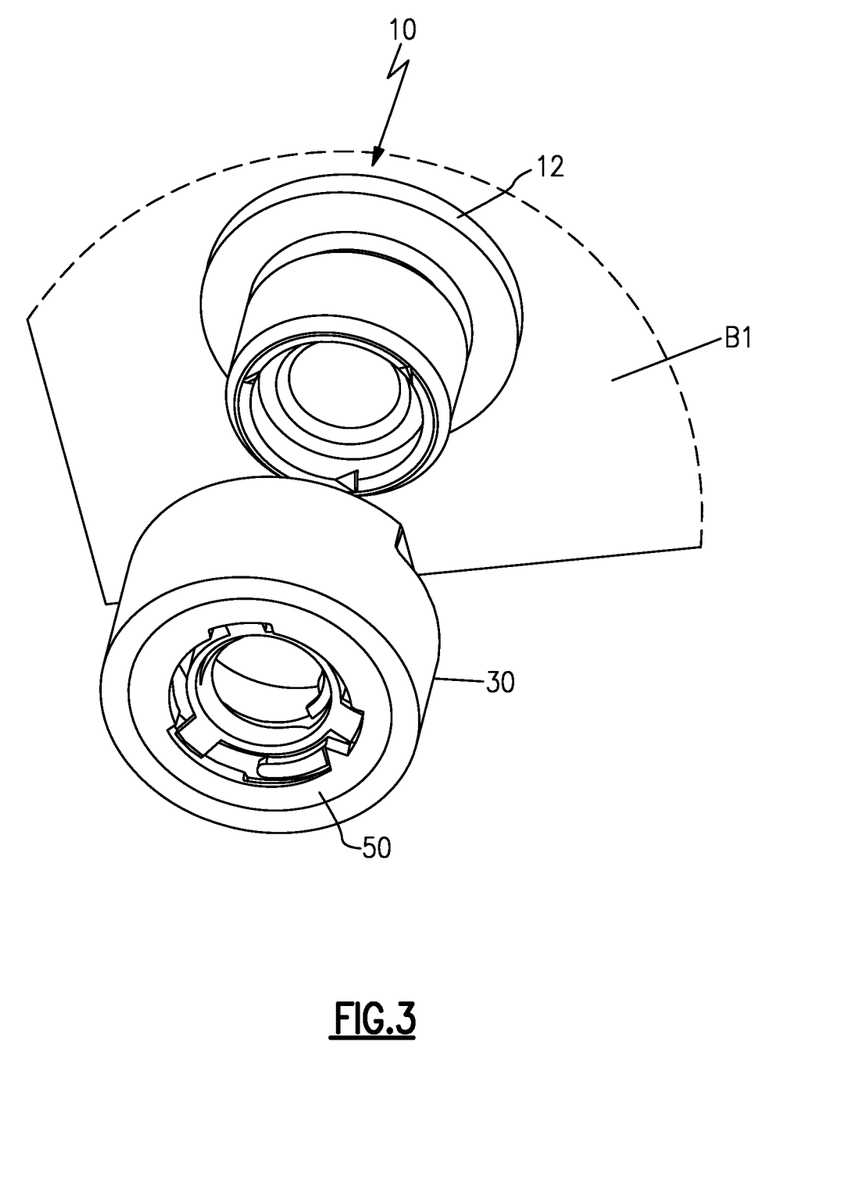
FIG. 3 is a preferred embodiment of the holding element and the adjusting element of the fastening device according to FIG. 2.
Figure 4:
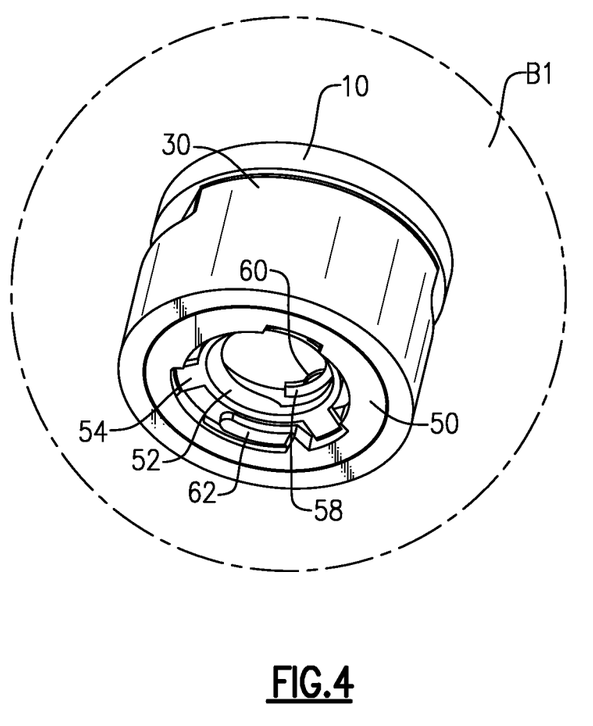
FIG. 4 illustrates the holding element and the adjusting element of FIG. 3, in a combined state.
Figure 5:
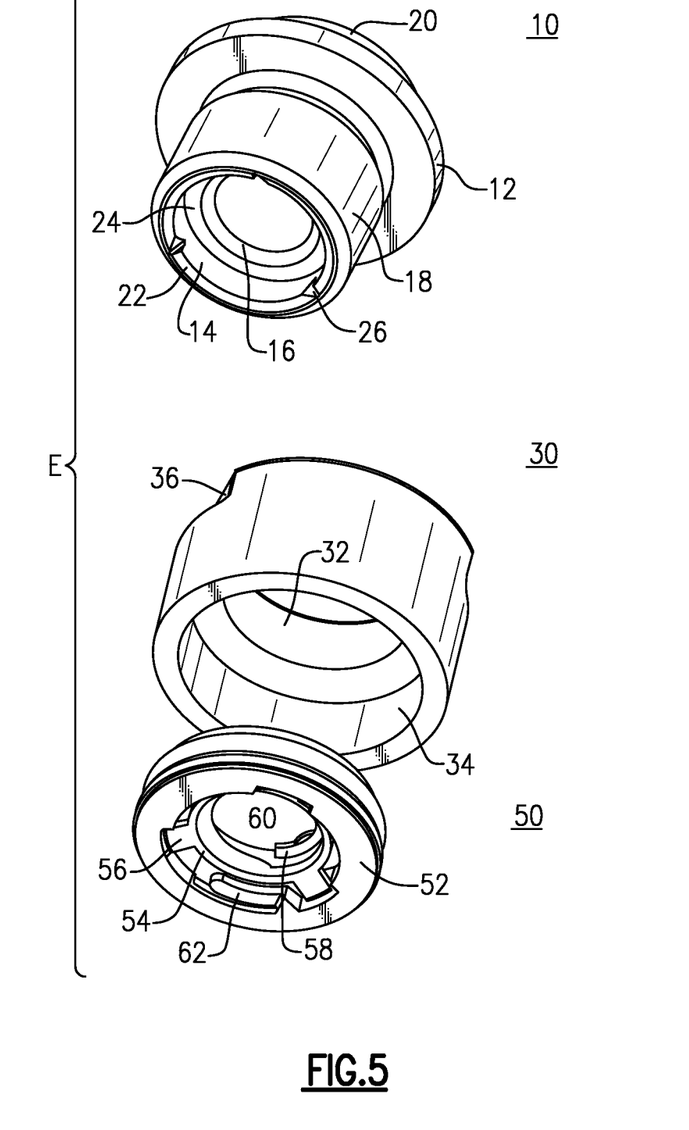
FIG. 5 is an exploded view of a preferred embodiment of the adjusting element with the carrying element, and of the holding element.

The holding element 10 in particular is illustrated in FIGS. 1, 3, and 5. The single-piece holding element 10 is comprised of a sleeve-like body, which on one axial end has a flange 12 and on the other axial end undergoes a transition to a cylindrical recess 14. The sleeve-like body of the holding element 10 extending between the flange 12 and the cylindrical recess 14 has an inner thread 16 on its radially inner side, which in particular may be a right-handed thread, which matches the thread of the fastening screw 70 (see FIG. 2). At the radial outer side of the sleeve-like body of the holding element 10, an outer thread 18 is provided which matches a radially inner thread on the adjusting element 30.

The outer thread 18 of the holding element 10 and the inner thread of the adjusting element 30 form a first thread pairing with a first thread direction. The thread of the fastening screw 70 and the inner thread of the holding element 10 and of the carrying element 50 form a second thread pairing with an thread direction which is opposite to that of the first thread pairing. These two thread pairings with opposite thread directions ensure that, when the fastening screw 70 is being screwed into the fastening device the adjustment element 30 is screwed out from the holding element 10 to the extent that the distance S between the two components B1 and B2 is compensated for.

The holding element 10 is preferably made of metal, preferably steel or another reliably deformable and thus fixable material. According to a preferred embodiment, the holding element 10 is fastened to the first component B1 with the aid of a rivet collar 20. In the un-installed state, the rivet collar 20 extends in the axial direction of the holding element 10, as illustrated, e.g., in FIGS. 10 and 11. The rivet collar 20 can be fixed in a guide of the first component B1 or in an opening with a countersink such that the rivet collar 20 is closed off flush with the upper side of the first component B1. An example of such an arrangement is shown in FIG. 1. The rivet collar 20 is preferably turned back with the principle of a wobble rivet, so that it is fixed to the guide or opening in the first component B1. In this way, the first component B1 is held between the rivet collar 20 and the flange 12 of the holding element 10.

The end of the holding element 10 which is opposite to the flange 12 bears the cylindrical recess 14. The cylindrical recess 14 is bounded on one side by the axial outer end face 22 and on the other side by the axial inner end face 24. According to the preferred embodiment shown in FIG. 5, the axial outer end face 22 has latch recesses 26. It is preferred to provide such latch recesses 26 on the axial inner end face 24 or on both end faces (22, 24) (not shown). One or more latch projections 64 of the carrying element 50 engage in the latch recesses 26, so that the adjusting element 30 once screwed onto the holding element 10 is held against rotation. This anti-rotation securing, which resists rotation only up to a certain threshold torque value, serves a means of securing the pre-assembled module comprised of the holding element 10 and adjusting element 30 with carrying element 50 during transportation, and also serves as a locking-security element.

The adjusting element 30 is preferably comprised of a sleeve-like base body made of metal, preferably steel. It is conceivable to employ other materials, such as, e.g., stable plastics, as long as these meet the mechanical stability requirements for the fastening device. The inner thread 32 of the adjusting element 30 is preferably a left-hand thread which matches the outer thread 18 of the holding element 10. In addition, the adjusting element 30 has a cylindrical recess 34 on one axial end. The carrying element 50 is pressed into this recess 34, where it is held by force, i.e. a non-positive fit. It is preferred if the carrying or dragging element 50 is held in the cylindrical recess by adhesion or another suitable means of fastening it there.

The adjusting element 30 has a drive means 36 on its radial outer side. Preferably, this drive means 36 comprises two diametrically opposite parallel surfaces, allowing the adjusting element 30 to be turned by an open end wrench. Such a drive means 36 is useful when the adjusting element 30 is to be loosened from an installed position.

Figure 6:
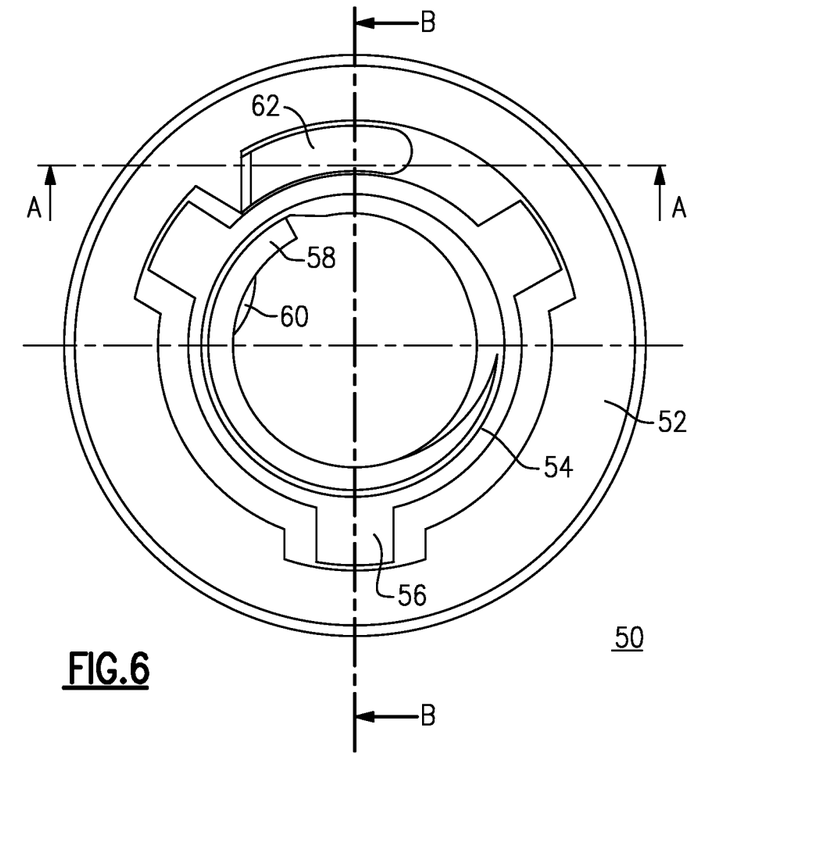
FIG. 6 is an axial plan view of a preferred embodiment of the fastening device.
Figure 7:
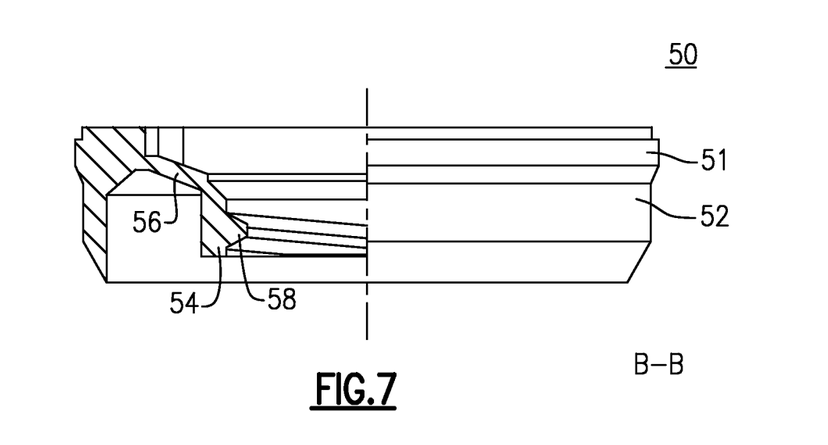
FIG. 7 is a partial cross section of a preferred embodiment of the fastening device along line B-B in FIG. 6.
Figure 8:
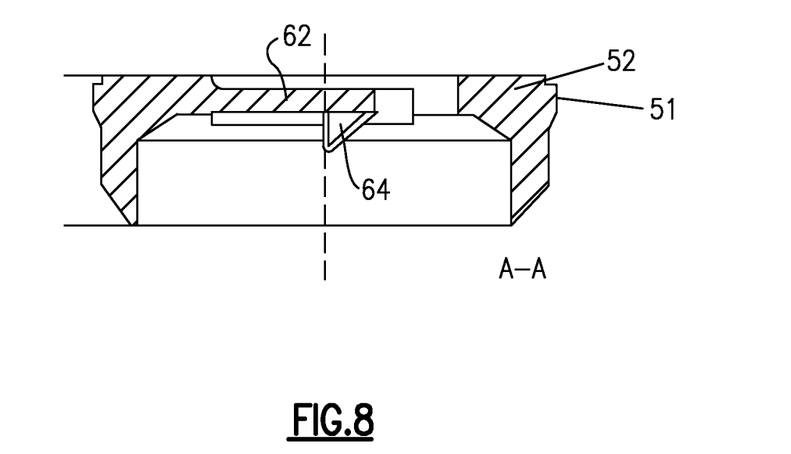
FIG. 8 is a cross section of the fastening device of FIG. 6, along line A-A.

The carrying element 50 is held in the cylindrical recess 34 of the adjusting element 30. The carrying element 50 is preferably comprised of plastic, but may be comprised of metal, as long as the carrying element 50 can be fixed reliably in the cylindrical recess 34. The carrying element 50 is comprised of a fastening ring 52, as shown in FIGS. 6, 7, and 8. The fastening ring 52 has an axial extent which matches the cylindrical recess 34 in the adjusting element 30. Additionally, the outer diameter of the fastening ring 52 is established such that the ring 52 can be pressed into the cylindrical recess 34. This pressing adjustment between the cylindrical recess 34 and the fastening ring 52 produces a forcible connection, so that the carrying element 50 and the adjusting element 30 are reliably interconnected. To support this connection, the fastening ring 52 has a radially outward bead 51 having an outer cross section which is greater than the inner diameter of the cylindrical recess 34. Further, the fastening ring 52, on its end facing away from the bead 51, is inclined radially inwardly, so that the incline assists in inserting the fastening ring into the hollow cylindrical recess 34.

As seen from FIG. 6, a ring 54 is spring-loadedly disposed radially inside the fastening ring 52. The spring loading is facilitated with the aid of projections 56, via which the ring 54 is connected to the fastening ring 52. At least two such projections 56 are needed in order to reliably hold the spring-loaded ring 54 in the fastening ring 52. The projections 56 have a thickness such that the ring 54 can change its axial position. E.g., the fastening screw 70 when not yet screwed into the spring-loaded ring 54 presses the ring 54 into the appropriate axial position so that the fastening screw 70 can engage the thread 58 of the carrying element 50. According to a further variation, the fastening screw 70 is screwed into the spring-loaded ring 54. In order to pass into the inner thread 16 of the holding element 10, the fastening screw 70 displaces the spring-loaded ring in the axial direction. This axial movement can be toward or away from the inner thread 16. Then the fastening screw 70 matchingly enters the inner thread 16 of the holding element 10.

It is also preferred to have more than two projections 56 for connecting the spring-loaded ring 54 to the fastening ring 52. The projections 56 are illustrated in FIG. 7, which is a partial cross section through line B-B of FIG. 6.

According to a preferred embodiment, the spring-loaded ring 54 has a thread 58 on its radial inner side, which thread is adjusted to the outer thread of the fastening screw 70. The thread 58 of the spring-loaded ring 54 has only one turn, extending over an angle of at maximum 360°. Preferably, the extent of the thread 58 is over a smaller angle of, e.g., 0-270°, particularly, preferably 0-180°. This thread turn ensures that the fastening screw 70 will enter the carrying element 50 frictionlessly. If the axial position of the thread turn 58 of the spring-loaded ring 54 is not adjusted to the thread of the fastening screw 70, the fastening screw 70 will automatically press the spring-loaded ring 54 into the appropriate axial position so that the thread turn 58 can enter the thread of the fastening screw 70. Accordingly, with the thread turn 58 adjusted in its shape to the threads of the fastening screw 70, a form-interlocking connection will be created between the spring-loaded ring 54, the carrying element 50, and the fastening screw 70. This connection ensures that the torque applied to the fastening screw 70 will also be transmitted to the carrying element 50 and thereby to the adjusting screw 30. Through this torque transmission, the adjusting element 30 is unscrewable from the holding element 10 until the distance S between the first component B1 and the second component B2 is adjusted for.

In the end region of the thread turn 58, the radial inner side of the spring-loaded ring 54 preferably has a detent or cam 60 which extends radially inwardly. The detent 60 ensures that the fastening screw 70 can be screwed into the thread turn 58 only as far as the detent 60. As long as the torque of the fastening screw 70 does not exceed a threshold value relative to the carrying element 50, the detent 60 acts a block on the carrying element thread. Accordingly, the carrying element 50 and thus also the adjusting element 30 are rotated along with the fastening screw 70. The means for blocking the carrying element 50 may be any means which prevents further insertion of the fastening screw 70 into the thread turn 58. Thus, e.g., a projection in the axial direction of the spring-loaded ring 54 can block the thread turn 58 so that the carrying element 50 is carried along by the fastening screw 70. Another embodiment of a means of blocking the carrying element thread consists of a spring-loaded projection (not shown) which extends radially into the interior of the spring-loaded ring 54. Preferably this radial projection is inclined in the tangential direction in the direction of rotation of the fastening screw 70. If the radial projection is loaded with the threshold torque, it will be spring-loaded radially outward, in order to free up the thread turn 58. After removal of the fastening screw 70, it is spring-loaded radially inward, in order to again provide the means for blocking the carrying element 50 to the thread of the carrying element. Thus, it is unnecessary to replace the carrying element 50 in the event of a new use.

In this connection it is also preferred to form the detent 60 in such a way that it is reversibly displaced radially outward by the fastening screw 70. Toward this end, the ring 54 is deformable and its inner diameter is greater than the nominal diameter of the thread of the fastening screw 70. If the threshold torque is exceeded, or if the adjusting element 30 abuts against the second component B2, and the fastening screw 70 presses the detent 60 radially outward, the ring 54 is deformed from its round shape into an oval shape. This deformation is such that the detent 60 frees up the interior of the ring 54, and the fastening screw 70 can be screwed further into the thread 58 of the carrying element 50.

It is also preferred for the fastening screw 70 to be able to irreversibly deform the detent 60 radially outward, when the fastening screw 70 exceeds the threshold torque with respect to the carrying element 50. In this case, the fastening screw 70 presses the detent radially outward, wherein the detent 60 frees up the interior of the ring 54 but is not separated from the carrying element 50.

According to another preferred embodiment of the invention, the carrying element thread 58 and the carrying element thread blocking element 60 are realized together in a thread which is undersized with respect to the thread of the fastening screw 70. Because the undersized thread is not congruent with the thread of the fastening screw 70, in particular because it has a smaller nominal diameter than the nominal diameter of the fastening screw 70, when the fastening screw 70 is rotated into the undersized thread the screw 70 becomes stuck, such that it rotates the adjusting element 30 with it, via the carrying element 50.

As soon as the fastening screw 70 has rotated the adjusting element 30 with it via the carrying element 50, to the extent that the distance S between the first component B1 and the second component B2 has been adjusted for, the adjusting element 30 with its end side directed toward the carrying element 50 rests against the second component B2. In this way, further rotation of the adjusting element 30 is impeded, so that when the fastening screw 70 is further rotated, the torque between the carrying element thread blocking element 60 and the fastening screw 70 is increased. As soon as this torque exceeds the abovementioned threshold value, the fastening screw 70 is screwed farther into the fastening device via the carrying element thread blocking element 60. As soon as the fastening screw 70 is fixedly screwed into the inner thread 16 of the holding element 10, or is secured with a nut (not shown), there is a fixed connection between the first component B1 and the second component B2 via the fastening device (see FIGS. 10 and 11).

FIG. 8 is a cross-sectional view through line A-A of FIG. 6. One can see the circular (in the circumferential direction) spring-loaded projection 62 from FIG. 6, one end of which is fastened to the fastening ring 52 and the other end of which bears a latch projection 64. Thus, the latch projection 64 is spring-loaded in the axial direction. It cooperates with the at least one latch recess 26 (see FIG. 5) on the axial outer end face of the holding element 10. If the adjusting element 30 with the in-pressed carrying element 50 is rotated over the holding element 10, the latch projection 64 of the carrying element 50 latches in one of the (preferably) three latch recesses 26 in the holding element 10. As a result of this latching engagement, the adjusting element 30 is protected against being secured (being fixedly engaged) by the holding element 10. In addition, the latching engagement between the latch projection 64 and the latch recess 26 provides security for transporting purposes, against an automatic loosening of the adjusting element 30 from the holding element 10.

According to the preferred embodiment illustrated in FIG. 5, the latch projection 64 is disposed on the spring-loaded projection 62 and cooperates with the latch recesses 26 on the axial outer end face of the holding element 10. It is also preferred to dispose the latch projection 64 (not shown) on the axial end face of the spring-loaded ring 54 which faces the adjusting element 30. In order to provide a latching engagement with the latch projection 64, the at least one latch recess 26 is provided on the axial inner end face 24 of the holding element 10. Because the spring-loaded ring 54 with the latch projection 64 (not shown) is spring-loaded and displaceable in the axial direction, the adjusting element 30 is releasably latchably engagable to the holding element 10 via the spring-loaded ring 54. This latching engagement would provide security against fixed engagement and security for transporting purposes. As soon as the fastening screw 70 is screwed into the fastening device, the spring-loaded ring 54 is released by a pressure in the axial direction from the fastening screw 70, from the latch engagement between the latch projection 64 and the latch recess 26, because it is sprung away from the holding element in the axial direction. After the loosening of the latching engagement, the fastening screw 70 can carry the adjusting element 30 in rotation with it, in the above-described manner, in order to adjust for the distance S between the first component B1 and the second component B2.

Figure 9:
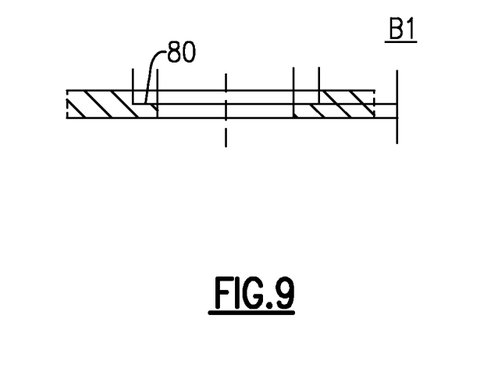
FIG. 9 is a cross section of a preferred embodiment of the first component.

FIG. 9 shows, in an enlarged view, a cross section through the first component B1. This first component B1 has an opening in the form of a guide or a sunken bore, so that the rivet collar 20 (see FIGS. 1, 10, and 11) can latch on the ridges (or recesses) in this opening. For this purpose, the rivet collar 20 is folded back with the abovementioned wobble riveting technique, so that the component B1 is held between the flange 12 and the folded-over rivet collar 20.

Figure 12:
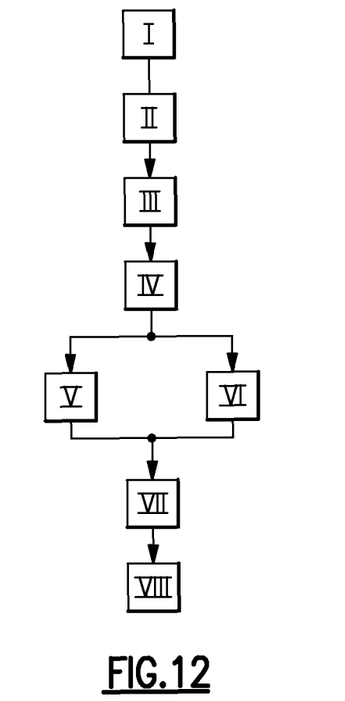
FIG. 12 is a flow diagram of a preferred embodiment of the installation process for the fastening device.

FIG. 12 shows a flow diagram of a preferred embodiment of the installation process for the fastening device. It comprises the following steps: First, the holding element 10 is fastened to the first component B1 (Step I). Preferably, for this end, the rivet collar 20 is turned back in an opening or guide 80 of the first component B1. According to one embodiment, the principle of a wobble rivet is used for it. Other methods can also be used which fix the holding element 10 even without the rivet collar 20 within the opening of the first component B1. This is carried out, for example, by screwing or bonding or by another riveting technique.

The holding element 10 is fastened to the first component B1 as a pre-mounted unit, i.e. with the adjusting element 30 being screwed on, preferably with latching engagement. Then the fastening screw 70 is guided through an opening in the second component B2 and is applied to the spring-loaded ring 52 of the carrying element 50. In order to ensure entry of the fastening screw 70 into the carrying element thread 58 of the above-described embodiments, the spring-loaded ring 54 is positioned in the axial direction of the fastening screw 70 (Step II). The fastening screw 70 presses the ring 54 into the appropriate axial position, so that the fastening screw 70 can be screwed into the carrying element thread 58 with the overcomeable carrying element thread blocking means 60. Then (Step III) there follows the screwing-in of the fastening screw 70 into the carrying element thread 58.

By additional rotation of the fastening screw 70 (in Step IV), the adjusting element 30 is also rotated via the carrying element 50, and is displaced in the axial direction to the second component B2. In this way, the distance S between the first component B1 and the second component B2 is adjusted for. As soon as the adjusting element 30 abuts against the second component B2, when the fastening screw is rotated farther the torque between the fastening screw 70 and the carrying element 50 increases. As soon as the threshold torque is reached, the fastening screw 70 overcomes the carrying element blocking means 60, which is in the form of a detent 60, a projection, or an undersized thread (see above) (Step V or VI). In this way, the radially inwardly extending detent 60 is irreversibly deformed radially outwardly by the fastening screw 70 (Step V) or is reversibly pressed radially outwardly (Step VI, see above). According to another alternative, the projection extending in the axial direction is displaced radially outwardly, or the fastening screw 70 is screwed into the undersized thread.

Before the fastening screw 70 is screwed into the inner thread 16 of the holding element 30, in Step VII there is a new axial positioning of the spring-loaded ring 54 over the fastening screw 70 which is screwed into it. The ring 54 is thereby displaced axially, such that the thread of the fastening screw 70 can extend into the inner thread 16 of the holding element 10. With the screwing of the fastening screw 70 into the holding element 10, the first component B1 is fixed to the second component B2. It is also preferred to secure the fastening screw 70 to the first component B1 with the aid of a nut.

List of Reference Numerals
10 Holding element
12 Flange
14 Cylindrical recess
16 Inner thread
18 Outer thread
20 Rivet collar
22 Axially outer end face
24 Axially inner end face
26 Latch recess
30 Adjusting element
32 Inner thread of the adjusting element
34 Cylindrical recess in the adjusting element
36 Drive means
50 Carrying element
51 Radially outer fastening bead
52 Fastening ring
54 Spring-loaded ring
56 Spring-loaded (springing) projection
58 Thread turn
60 Carrying element thread blocking means
62 Spring-loaded projection (arm)
64 Latch projection
B1 First component
B2 Second component
S Distance It will be readily apparent that other modifications and variations are possible within the intended scope of the invention as described and according to the following claims:

The invention claimed is:

1. A fastening device for fastening a first component to a second component, with automatic tolerance compensation in the distance between the first component and the second component, said device comprising:

a cylindrical holding element having a first end fixable to the first component, and a second end having an outer thread and an inner thread;

a cylindrical adjusting element having a first end having an inner thread which can be screwed together with the outer thread of said holding element, in a first thread pairing with a first thread direction; and a carrying element releasably or permanently connected to a second end of said adjusting element, said carrying element comprising a fastening ring which is pressed into a second end of said adjusting element or permanently held by a suitable means of fastening, and a spring-loaded ring resiliently connected within the fastening ring via at least two projections extending in the radial direction;

wherein the spring-loaded ring is spring-loaded in the axial direction of the adjusting element, said spring-loaded ring having an inner carrying element thread and an overcomeable carrying element thread blocking means for receiving a fastening screw and transmitting a rotational movement of the fastening screw to the adjusting element;

wherein the fastening screw can be screwed into the inner thread of said holding element via a second thread pairing with a second thread direction which is opposite to the first thread direction; and wherein when the fastening screw is rotated the adjusting element is rotated along with it, and thereby, for the purpose of adjusting for tolerances, is moved into abutment with the second component.

2. A fastening device according to claim 1, the carrying element thread blocking means of which, in combination with the carrying element thread, is in the form of an undersized thread in comparison to the thread of the fastening screw, so that a nominal diameter of the thread of the fastening screw is greater than a nominal diameter of the carrying element thread.

3. A fastening device according to claim 1, in which the carrying element thread is conformed to match the thread of the fastening screw.

4. A fastening device according to claim 1, in which the carrying element thread has a maximum of one thread turn, over an angle of rotation of at most 360°.

5. A fastening device according to claim 1, in which the carrying element thread blocking means comprises at least one of a radially inwardly projecting detent and an axially extending projection, said detent and projection being deformable and disposed near an outlet of the carrying element thread.

6. A fastening device according to claim 1, in which the holding element has at least one latch recess on an end side directed toward the spring-loaded ring, so that the adjusting element is releasably latchable against rotation, via one of a circular arcuately extending spring arm with a latch projection on the fastening ring and an axial latch projection on the spring-loaded ring.

7. A fastening device according to claim 1, in which the first end of the holding element has a rivet collar with which the holding element is joinable in a guide of the first component.

8. A component with an installed fastening device according to claim 1.

* * * * *